Nov. 25, 1958    P. D. BERMINGHAM    2,861,712
COMBINED SEAL AND RETAINING DEVICE
Filed June 11, 1952    2 Sheets-Sheet 1

INVENTOR
PETER D. BERMINGHAM
BY J. William Freeman
ATTORNEY

Nov. 25, 1958 P. D. BERMINGHAM 2,861,712
COMBINED SEAL AND RETAINING DEVICE
Filed June 11, 1952 2 Sheets-Sheet 2
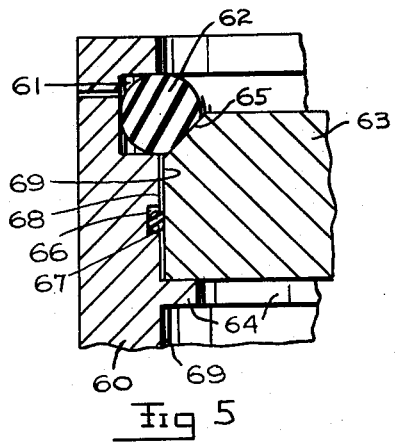
Fig 5
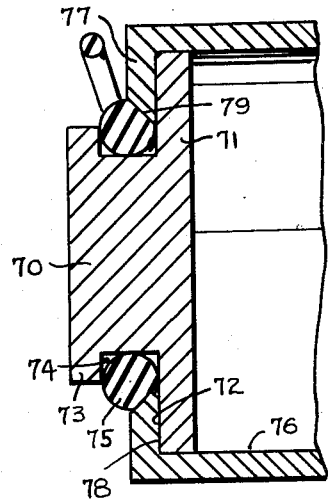
Fig 6
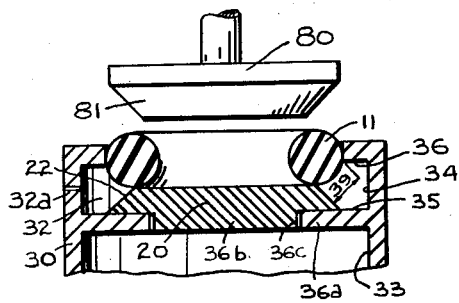
Fig 7
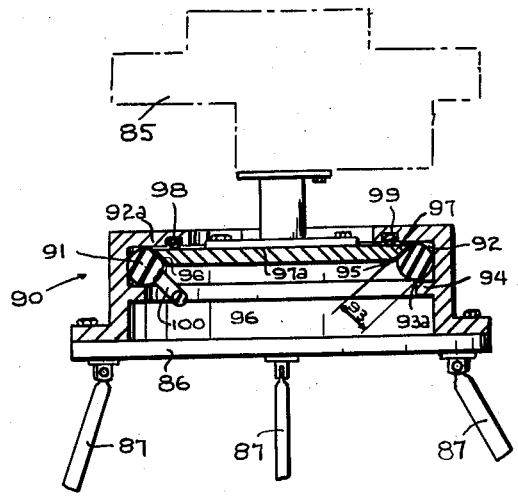
Fig 9
Fig 8
INVENTOR
PETER D. BERMINGHAM
BY
J. William Freeman
ATTORNEY യ
United States Patent Office 2,861,712
Patented Nov. 25, 1958

2,861,712

COMBINED SEAL AND RETAINING DEVICE

Peter D. Bermingham, Suffield, Ohio, assignor of ten percent to J. William Freeman, and five percent to Robert V. Maher, both of Akron, Ohio Application June 11, 1952, Serial No. 292,937

9 Claims. (Cl. 220—55)

This invention relates to closure devices and in particular relates to closure devices employed to effectuate entrapment of a fluid body within a confined area.

In the past, several devices have been employed in an attempt to satisfactorily cope with the problem of providing a fluid tight seal between a container and the closure plate thereof.

While these various devices have incorporated numerous structural differences, the majority of the same have been designed towards the end of providing a clamping force upon a gasket positioned between the rim of the container and the corresponding rim of the closure plate. In this manner, it was theorized that an effective seal could be maintained by virtue of the pressure on the gasket, which pressure caused compression of the gasket and thereby forced the same into the irregularities between the container rim and the rim of the closure plate, and theoretically effectuated an efficient seal between the container and the closure plate.

An example of the above teaching may be found by consideration of the usual canning jar normally employed for home-canning use. In this case, a rubber ring, positioned on the rim of the canning jar, is compressed into theoretical sealing relationship between said rim and a cap by virtue of a threaded relationship between said cap and the exterior of said jar, whereby the cap may be threaded down to exert the requisite pressure on the interposed ring.

In cases where an exteriorly threaded relationship between the closure plate and the container is neither desirable nor feasible, substantially the same result has been obtained by employing several bolts, receivable through appropriate apertures in the closure plate and being operably received within aligned tapped recesses, whereby a gasket, positioned between said closure plate and said container, may have force exerted thereon by the mere tightening of said bolts in known manner.

In both of the above described examples of prior art, it is manifest that the effectiveness of the seal is directly dependent on the pressure exerted on the interposed gasket, and accordingly one serious disadvantage arises in the fact that this seal is oftentimes broken when the threaded connection is jarred loose by repeated vibrations incident to normal usage.

A further disadvantage arises in many cases, and particularly in cases involving use in aircraft installation, where the added weight of the many bolts necessary, operates to a definite disadvantage from a design standpoint.

Accordingly, one object of this invention is to provide a sealing device which is not dependent on threaded construction for a satisfactory result.

It is a further object of this invention to provide a sealing mechanism not subject to loss of effectivity by virtue of jarring or shaking.

It is a further object of this invention to provide a sealing mechanism wherein the effectivity thereof is directly proportionate to the pressure exerted thereagainst.

It is a further object of this invention to provide a sealing device wherein the sealing element thereof serves the additional function of retaining the closure plate in proper relationship to the container.

It is further object of this invention to provide a retaining unit adaptable to separate use as a shock dampening unit.

It is a further object of this invention to provide a sealing device made up of lightweight basic component parts.

It is a still further object of this invention to provide a sealing device possessing extremely long life by virtue of the simplified construction thereof.

These and other objects of the invention will become more apparent upon consideration of the following brief specification, read in the light of the accompanying drawings.

Of the drawings:

Figure 5 is a view of a modified form of the invention.

Figure 6 is a view of a further modification of the invention.

Figures 7 and 8 are views illustrating how a modified form of the invention may be positioned in place.

Figure 9 is a view showing use of the invention in a different field of art.

Figure 1:
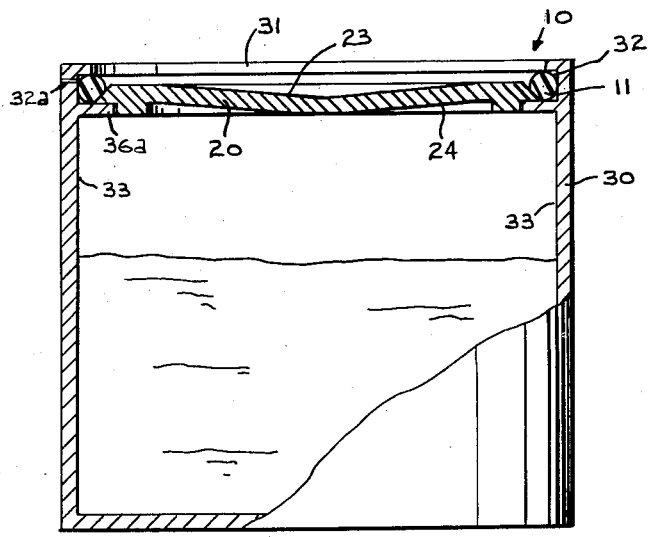
Figure 1 is a side elevation, partly broken away and in section and illustrating a container embodying the invention.

Referring now to the drawings and in particular to Figure 1 thereof, the closure mechanism, generally indicated as 10, is shown operating to retain a closure plate 20 in sealing relationship with the mouth 31 of a circular container 30.

While the overall effectivity of the closure mechanism 10 is manifestly dependent upon certain structural features of both the container 30 and the closure plate 20, the closure device 10, in essence, comprises an endless, annular O ring 11 of resilient material, and being of normally circular cross section, although the resilient nature of the O ring 11 dictates that the same may be distorted when placed in operation in a manner to be described. (See Figure 2.)

For the purpose of receiving the above-described O ring 11, the container 30 may be shown to include an endless groove 32, provided on the inner surface 33 of said container 30 at a point adjacent the mouth 31 thereof. While the width of the groove 32, as defined by wall 34, approximates the cross-sectional diameter of the O ring 11, the depth thereof, as defined by sidewalls 35 and 36, is equal to approximately one half of said cross sectional diameter of the O ring 11. A shoulder extension 36a, shown as an integral continuation of sidewall 35, serves to prevent displacement of the O ring 11 from the within groove 32 during operation.

Figure 2:
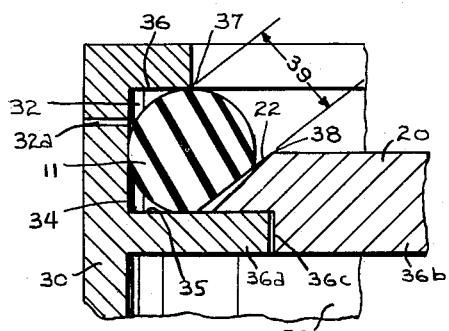
Figure 2 is an enlarged cross section of the sealing mechanism.

Because the closure plate 20 must assume the position shown in Figures 1 and 2, the same is illustrated as including a circular plate having a diameter of such dimension that the plate 20 may be passed by the inwardly projecting sidewall 36 and will be consequently abutted in supporting relationship by the extension 36a (See Figure 1.)

For the purpose of positioning the cover plate 20 concentrically with relation to the container 30, there is provided an undercut portion 36b of reduced diameter and being defined by a shoulder 36c, which is received concentrically against the extension 36a. In like manner, the peripheral edge portions 21 thereof are shown chamfered, as at 22, to permit the same to be wedged against the O ring 11, thereby forcing the O ring 11 into sealing engagement with the sidewalls of the groove 32. To the end of increasing the effectivity of this seal in cases involving extremes in internal pressure, the cover plate may be conically formed so as to present a concave side 23 and a convex side 24, whereby an increase in pressure exerted against the convex side 24 will cause an expansion of the overall diameter of the plate 20 with a resultant increase in the pressure exerted by the chamfered edge 22 against the O ring 11 (see Figure 2). However, it is manifest that under normal conditions a perfectly flat closure plate may be satisfactorily employed.

In use or operation of the improved sealing device, the user first positions the container 30 in the upright position shown in Figure 1, and with the same so positioned next locates the closure plate 20 on the shoulder extension 36a, the same automatically lining up concentrically with the container 30 by virtue of the undercut 36b. In this position it is manifest that the distance from the point 37 (on sidewall 36) to the point 38 (on the chamfered edge 22 of the closure plate 20), which is referred to as retaining dimension 39, will be considerably less than the cross-sectional diameter of the O ring 11 and accordingly the O ring 11 will have to be forced, bit by bit, into the groove 32.

With the unit thus assembled, it is manifest that the O ring 11 will be distorted to the position shown in Figure 2. In this position a continuous peripheral seal is established between the O ring 11 and four other points, namely, (1) the chamfered edge 22, (2) the sidewall 35, (3) the wall 34, and (4) the sidewall 36. Thus it can be seen that fluid, entrapped within the container would have to pass by at least three of the four aforementioned sealing points to escape from the container. Escape of fluid past the seal created between the chamfered edge 22 and the O ring 11 is prevented by virtue of the continual pressure exerted by the compressed O ring 11 against the chamfered surface 22, and it becomes apparent that this seal will be increased when additional pressure is exerted against the convex surface 24.

Because the aforementioned retaining dimension 39 is less than the cross-sectional diameter of the O ring 11, it is also manifest that the same will not become displaced from within the groove 32 during operation. This is true even in the event of a sudden increase in pressure inasmuch as such an increase in pressure would tend to force the plate 20 upwardly with a resultant decrease in the retaining dimension 39.

When it is desired to remove the contents from the container 30, the closure plate 20 may be disengaged therefrom by dislodging the O ring 11 from its place within the groove 32. This is done by inserting a suitable shaft (not shown) through the aperture 32a and exerting inward pressure on the shaft against the O ring 11, thereby causing a partial displacement of the O ring from the groove 32. Complete removal is then easily accomplished by manually grasping the displaced portion and pulling the remainder of the O ring 11 out of the groove.

Use of the aforementioned method of removal does not operate to destroy the effectiveness of the seal, inasmuch as the aperture 32a is located at a point on the wall 34 that is not normally engaged by the O ring 11. To facilitate the above method of removal, it is manifest that the aperture 32a may be inclined from the horizontal to so direct the shaft (not shown) towards the center of the retaining dimension.

It will be seen from the foregoing that a new and novel sealing device has been provided wherein multiple sealing points are created by virtue of the provision of an endless annular O ring 11 of a resilient nature. It has also been shown how the use of an endless annular O ring prevents accidental dislodging of the closure plate with respect to the container and also how this O ring provides a seal wherein the effectivity thereof is directly proportional to the pressure exerted upon the closure plate.

Figure 3:
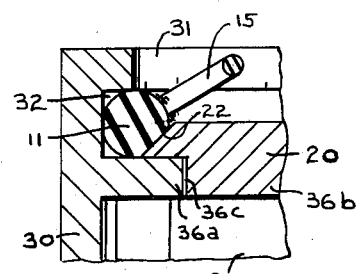
Figure 3 is a cross-sectional view of a modified form of the invention.

In Figure 3, there is shown a modified form of the invention wherein the O ring 11 is modified to include a tab 15, provided thereon for the purpose of permitting removal of the O ring 11 from the groove 32 without the necessity for providing a removal aperture 32a (not shown) as previously discussed in connection with Figures 1 and 2.

Figure 4:
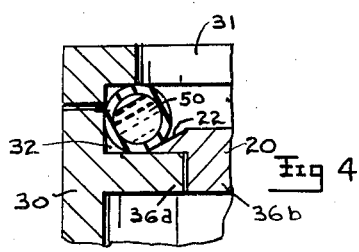
Figure 4 is a cross-sectional view of a modified form of the invention.

The modification set forth in Figure 4 is similar in all respects to the device shown and described in connection with Figures 1 and 2, with the single exception that the conventional O ring is replaced by a pressure-filled, endless annular hollow ring 50, for the purpose of illustrating the adaptability of certain recently developed pressure filled O rings to the new and novel sealing device previously set forth.

The modification set forth in Figure 5 operates on the same theory as the device described in connection with Figures 1 and 2, although the structure is modified to some extent to provide certain desired features. Accordingly, the wall 60 of a container is provided with an inwardly-presented groove 61, extending endlessly around the periphery of the container and being designed to receive therein an endless annular O ring 62 of resilient material. A closure plate 63, having an outside diameter approximating the inside diameter of said wall 60, is receivable within the said container and is supported in relation thereto by an inwardly projecting ledge 64, provided on the interior surface of the wall 60 at a spaced distance from the groove 61. As before, one edge portion of the closure plate 63 is chamfered, as at 65, to provide a wedging surface for engagement with the O ring 62. For the purpose of providing an auxiliary seal, a second inwardly presented groove 66 is provided on the interior surface of the wall 60 at a spaced distance from the groove 61. (See Figure 5.) This groove 66, provided with the O ring 67 in known manner, insures a fluid tight peripheral seal between the interior surface 68 of the wall 60 and the exterior wall surface 69 of the closure plate 63.

In the preceding descriptions of the invention and the modifications thereto, the requisite groove has been shown as being provided on the wall of the container under consideration. However, the modification shown in Figure 6 illustrates how the invention can be modified to have the requisite groove provided in the closure plate. Accordingly, in this modified form of the invention, the closure plate 70 is shown as being defined by a disc 71 having a surface 72 thereof provided with a shaft 73, of reduced diameter. A groove 74, provided on the shaft 73 has one sidewall thereof defined by the surface 72 for the purpose of receiving therein an annular O ring 75 which may be positioned in the groove 74 by stretching the same over the shaft 73. To the end of retaining the O ring 75 within the groove 74, the interior wall 76 of the container is provided with an inwardly presented ledge 77, extending endlessly around said wall 76 and having a surface 78 against which the surface 72 of the closure plate 70 abuts, while a chamfered surface 79 is also provided on said ledge 77 to provide the requisite wedging surface necessary to retain said O ring 75 within said groove 74.

By like token, in all previous forms of the invention, the diameter of the O ring has always approximated the exterior diameter of the groove within which the same was received. However, in Figures 7 and 8, the modification shown therein differs in that the O ring 11 is retained within the groove in a stretched condition, the retention therein being made possible by virtue of the fact that the retaining dimension 39 is smaller than the diameter of the O ring 11. However, while the structure of the sealing device 10 remains the same as that employed in connection with the description of Figures 1 and 2, and accordingly like numerals indicate like parts, a different method of installation may be employed. Accordingly, the O ring 11, is shown in Figure 7 as being positioned in normal condition on the plate 20. Installation of the O ring 11 within the groove 32 may then be facilitated by lowering the tapered ram 80 into the position shown in Figure 8, it being manifest that the gradual stretching force exerted by the tapered surface 81 of the ram will gradually ease the O ring 11 past the restricted area, as defined by the retaining dimension 39, and into the groove 32, wherein it will be retained by virtue of its inability to repass through the restricted area defined by the retaining dimension 39, unless aided by auxiliary force directed through the aperture 32a as previously described.

Figure 9 illustrates how the basic principles of the sealing device can be utilized to present a new and novel retaining device for use in unrelated fields of art. In this modification, the device 90, embodying the features of this invention, is shown interposed between a scientific instrument, diagrammatically illustrated as 85, and a mounting plate 86, from which pivotally depend supporting legs 87, 87. As before, an endless annular O ring 91 is retained within a groove 92 by virtue of a restricted distance 93 between a point 93a on the sidewall 94 of the groove 92, and a point 95 provided on a chamfered surface 96 of a plate 97. Complete dampening action is provided in this modified form of the invention by inclusion of a second endless O ring 98 within a groove 99, thereby separating the surface 97a of the plate 97 from the sidewall extension 92a of the groove 92. (See Figure 9.) Removal of the O ring 91 from the groove 92 is provided for by inclusion of a tab pull 100 which, as has been previously explained, may be pulled with the requisite force necessary to dislodge the O ring 91 past the restricted distance 93.

Figure 10:
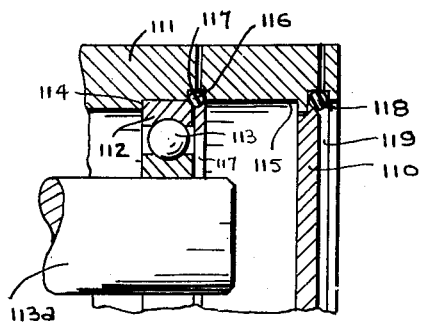
Figure 10 is a view of a still further modification of the invention.

In Figure 10, a typical installation is shown to illustrate how the invention can be utilized for retaining a cover plate 110 in sealing relation to a container 111, by virtue of an endless O ring 118 retained in a groove 119 as previously described in connection with Figures 1 and 2. The auxiliary use for retaining alone is further exemplified in this modified form of the invention, wherein the outer race 112 of a ball bearing unit 113, which is received on a rotating shaft 113a, is shown retained against a shoulder 114, provided on the wall 115 of the container 111. As before, this is accomplished by virtue of an O ring 116 received in the groove 117 as previously described.

Other modifications, including the alteration of the shape of either or both the groove and endless ring received therein, may be resorted to without departing from the spirit of this invention or the scope of the appended claims.

What is claimed is:

1. A closure seal for retaining a liquid body within a confined area, comprising; a container having a groove provided on the inwardly presented wall surface thereof; a resilient, endless O ring partially receivable within said groove and having a cross-sectional diameter not greater than the width of said groove; a closure plate having the bevelled peripheral portion thereof receivable against the inner wall of said container with the bevelled face forming a wall of the groove; an inwardly presented ledge, provided on the inner wall surface of said container for supporting said closure plate with respect thereto; said ledge being located so as to have said bevelled peripheral face of said closure plate restrict the opening of said groove; means for effectuating removal of said O ring from said groove; and a second auxiliary O ring receivable in a corresponding endless groove to provide an auxiliary seal between the inner wall of said container and the peripheral wall of said closure plate.

2. A closure seal for retaining a liquid body within a confined area, comprising; a container having a groove provided on the inwardly presented wall surface thereof; a resilient, endless O ring partially receivable within said groove and having a cross-sectional diameter not greater than the width of said groove; a closure plate having the bevelled peripheral portion thereof receivable against the inner wall of said container with the bevelled face forming a wall of the groove; an inwardly presented ledge, provided on the inner wall surface of said container for supporting said closure plate with respect thereto; said ledge being located so as to have said bevelled peripheral face of said closure plate restrict the opening of said groove; and means for effectuating removal of said O ring from said groove, the overall diameter of said endless O ring being less than the overall diameter of said groove whereby said O ring is retained within said groove in stretched condition.

3. A device of the character described, comprising; a container having an inwardly presented, bevelled lip portion adjacent the opening thereof; a closure plate, having the peripheral edge thereof receivable against the inner wall surface of said container and being provided with an endless groove in a reduced portion thereof receiving said lip wherein the bevelled face of said lip forms a wall of said groove; an endless O ring having a peripheral portion thereof receivable within said groove and being retained therein by said bevelled edge of said inwardly presented lip; and means for effectuating removal of said O ring from said groove.

4. A fluid seal, comprising; a cylindrical surface having a groove therein that is defined by opposed side walls and a bottom wall; a member having a bevelled peripheral edge portion; an annular cavity, define by said groove and said bevelled peripheral edge portion, and having an opening extending circumferentially between one sidewall of said groove and said bevelled edge portion; and an endless, resilient, annulus, receivable within said cavity and having a peripheral portion thereof extending through said opening; the diameter of any segment of said annulus being greater than the width of said opening, whereby said annulus is normally retained within said cavity as a result of its inherent recovery properties; said annulus additionally spacing the peripheral edge of said member from said bottom wall of said groove.

5. A fluid seal, comprising; a member having a cylindrical wall surface; a radial groove provided on said wall surface and having the width and depth thereof determined by axially spaced sidewalls and an interconnecting bottom wall; a thin circular closure plate having a tapering peripheral edge portion that terminates in a substantially feathered peripheral edge that is received against one said sidewall of said groove whereby said tapering edge restricts the width of said groove; and a resilient endless annulus partially received within said groove; said annulus having inherent recovery properties and being originally of circular cross-section so as to be in contact with said opposed side walls, said interconnecting bottom wall, and said tapering peripheral edge portion of said closure plate whereby said annulus tensionally spaces said peripheral edge portion of said plate from said bottom wall of said groove while maintaining said plate in engagement with said side wall of said groove; the restricted width of said groove being less than the cross-sectional diameter of said annulus; said tapering edge portion of said plate being shiftable whereby variable amounts of pressure can be exerted thereby against said annulus.

6. The device as set forth in claim 5 further characterized by the presence of means for effectuating removal of said annulus from within said groove.

7. The device as set forth in claim 5 further characterized by the fact that said annulus is hollow and has pressurized fluid enclosed therein.

8. The device as set forth in claim 6 further characterized by the fact that said means include an integral tabular extension provided on said annulus.

9. The device of claim 6 further characterized by the fact that said means include a radial aperture in said groove communicating with the exterior and interior surfaces thereof.

References Cited in the file of this patent

UNITED STATES PATENTS

| | | |
|---|---|---|
| 2,578,389 | Andersson | Dec. 11, 1951 |
| 2,575,446 | Gollong | Nov. 20, 1951 |
| 2,583,873 | Nichols | Jan. 29, 1952 |
| 2,604,751 | Haley | July 29, 1952 |
| 2,611,505 | Winborn et al. | Sept. 23, 1952 |
| 2,628,740 | Haley | Feb. 17, 1953 |

FOREIGN PATENTS

| | | |
|---|---|---|
| 261,480 | Germany | June 23, 1913 |
| 461,723 | Great Britain | Feb. 23, 1937 |
| 216,555 | Switzerland | Dec. 16, 1941 |